United States Patent [19]
Mumalo

[11] Patent Number: 5,330,725
[45] Date of Patent: Jul. 19, 1994

[54] VACUUM TRUCK EXHAUST GAS TREATMENT APPARATUS

[75] Inventor: Richard A. Mumalo, Long Beach, Calif.

[73] Assignee: Rust Industrial Services Inc., Westbrook, Ill.

[21] Appl. No.: 534,594

[22] Filed: Jun. 7, 1990

[51] Int. Cl.⁵ ............................................. B01D 53/18
[52] U.S. Cl. .................................. 422/170; 422/171; 422/177
[58] Field of Search ....................... 422/170, 171, 177; 423/220, 230, 244, 245.2

[56] References Cited

U.S. PATENT DOCUMENTS

| | | | |
|---|---|---|---|
| 3,476,524 | 11/1969 | Burke | 422/170 |
| 3,870,474 | 3/1975 | Houston | 422/171 |
| 4,251,486 | 2/1981 | Sohda | 422/170 |
| 4,462,977 | 7/1984 | Reed | 422/171 |
| 4,487,754 | 12/1984 | Reed | 422/171 |
| 4,623,524 | 11/1986 | Someya et al. | 422/171 |
| 4,719,088 | 1/1988 | Itoh et al. | 422/170 |

FOREIGN PATENT DOCUMENTS 766747 1/1957 United Kingdom ............... 422/170

Primary Examiner—Timothy M. McMahon
Attorney, Agent, or Firm—Allegretti & Witcoff, Ltd.

[57] ABSTRACT

A vacuum truck exhaust gas treatment apparatus for removing gases from air discharged from a vacuum truck comprising a trailer having an enclosed housing attached thereto with the housing divided into four internal, isolated chambers of equal volume with gas removal materials within each chamber. Air and gases discharged from a vacuum truck are directed into a first chamber of the treatment system and circulated through the remaining chambers whereupon the gases are removed and clean air is discharged to the atmosphere.

11 Claims, 9 Drawing Sheets

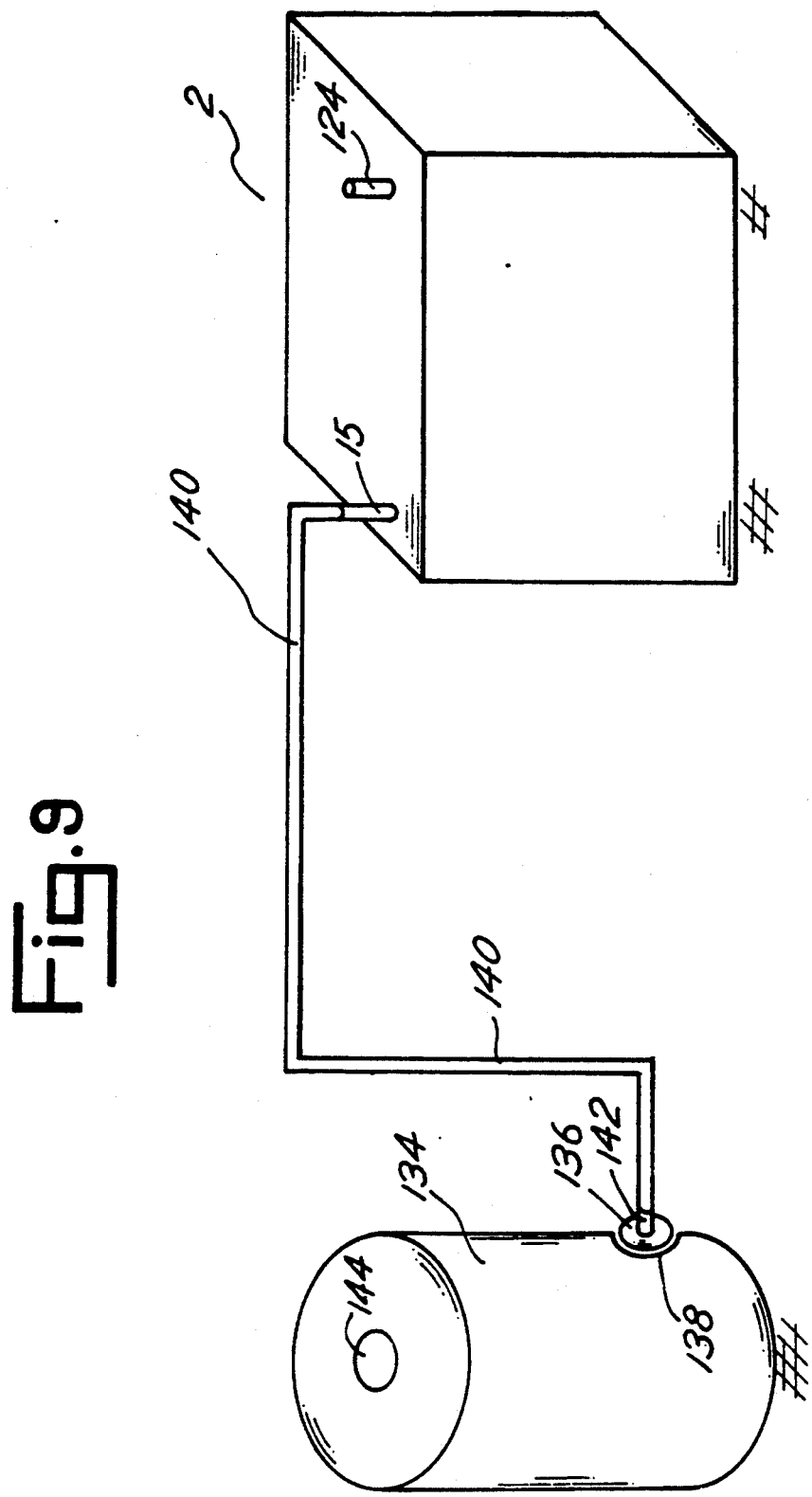

VACUUM TRUCK EXHAUST GAS TREATMENT APPARATUS

BACKGROUND OF THE INVENTION

This invention relates to the field of hydrocarbon gas treatment systems and in particular to mobile gas treatment systems that remove hydrocarbon gases from air discharged from a mobile source.

Prior art mobile gas treatment systems have been aimed at purifying the exhaust emissions of an automobile engine. No mobile gas treatment system has addressed the problem of removing hydrocarbon gases from large quantities of air discharged from a mobile source.

The problems with prior art mobile gas treatment systems is that they are limited to treating exhaust emissions from automobiles, and they cannot process the large quantities of air discharged from a mobile source the size of a vacuum truck.

Examples of prior art devices include those disclosed in the following United States Patents:

U.S. Pat. No. 4,784,676 discloses a disposable vacuum cleaner bag containing water that functions as a dust removal media. One problem with this device is that it cannot remove hydrocarbon gases from air. Another problem is that it cannot handle the large quantities of air and gas discharged from a vacuum truck.

U.S. Pat. No. 4,774,974 discloses a system for removing toxic particulate materials from surfaces to a van body. The problem with this device is that it cannot remove gas from air.

U.S. Pat. No. 4,588,535 discloses a combustion gas treatment system that directs hot combustion gases into vertical ducts where a washing liquid from sprinklers at the upper end of the ducts, remove solid and soluble components while simultaneously cooling the gas.

U.S. Pat. No. 4,540,162 discloses a precious metals refining process whereby gases or vapors that result from acid action on the precious metals, are purified by utilizing a series of containers having baffle plates and water therein.

U.S. Pat. No. 4,251,486 discloses a system for decomposing injurious gases to make them harmless by utilizing a decomposition tower having an internal aqueous solution at the bottom with circulating means and nozzles to spray the aqueous solution into contact with the injurious gas. The injurious gas is decomposed and the decomposition products are washed down into the aqueous solution. The remaining injurious gas which has not been decomposed is directed into first and secondary reaction vessels having the same decomposition spray as the decomposition tower whereupon all remaining gases are rendered harmless.

U.S. Pat. No. 3,998,613 discloses an apparatus for removal of sulfur dioxide and particulate matter from hot flue gases from a furnace. Circulating water in the apparatus combines with the flue gas thereby removing sulfur dioxide and particulates and simultaneously cooling the gas.

U.S. Pat. No. 3,984,219 discloses an engine purifier muffler that utilizes polyurethane foam and water to filter engine exhaust gases with the internal water level above the input line to attenuate the noise.

U.S. Pat. No. 3,922,152 discloses a multiple stage filter for removing pollutants from exhaust gases. Each stage has a tubular coil with a plurality of holes along the upper side of the coil to allow gases to rise from the coil into a layer of water and sandstone. The sandstone layer has large stones at the bottom and progressively smaller stones toward the top of the layer. The filtered gas is then directed through the remaining stages which have the same design as the first stage. The filtered gas is then discharged to the atmosphere after passing through the final stage.

U.S. Pat. No. 3,793,807 discloses a process for purifying exhaust emissions from an automobile engine that directs the exhaust gas through a series of small tanks containing a mixture of saline solution and a solution of tri-sodium phosphate.

SUMMARY OF THE INVENTION

It is an object of the invention to provide a mobile gas treatment apparatus to remove hydrocarbon gases from air discharged from a mobile source such as a vacuum truck.

It is an object of the invention to provide a mobile gas treatment apparatus having a housing with internal isolated chambers therein with gas removal means in each chamber.

It is an object of the invention to provide a mobile gas treatment apparatus that discharges clean air to the atmosphere.

It is an object of the invention to provide a mobile gas treatment apparatus having gas circulation means between adjacent chambers in said housing.

It is an object of the invention to provide a mobile gas treatment apparatus having internal isolated chambers and access means to each chamber.

BRIEF DESCRIPTION OF THE DRAWING

FIG. 9 is a perspective view of an alternative system incorporating a gas treatment apparatus in accordance with this invention wherein the apparatus has only the intake and outlet pipes shown.

DESCRIPTION OF PREFERRED EMBODIMENT

Figure 1:
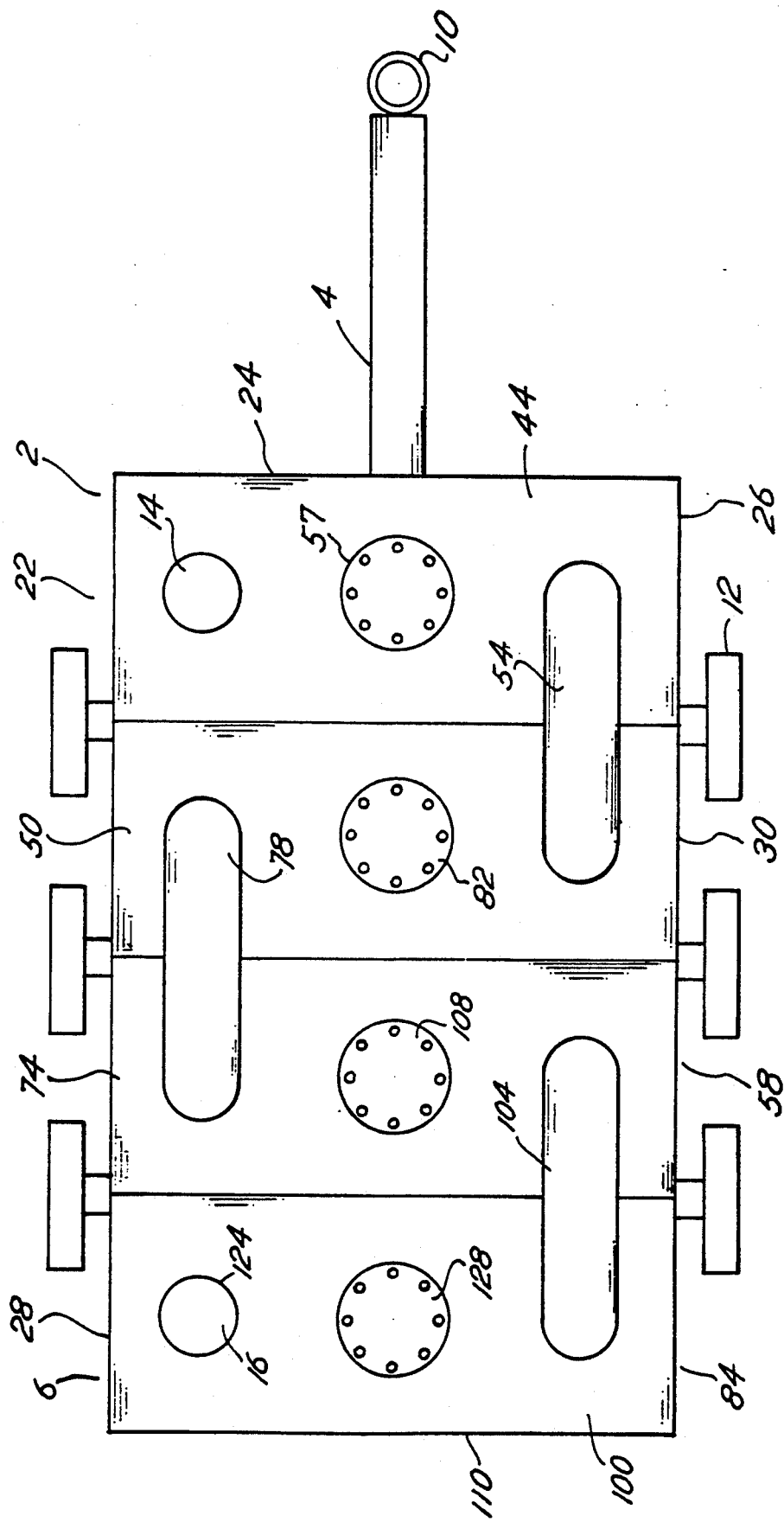
FIG. 1 is a plan view of a vacuum truck exhaust gas treatment apparatus in accordance with this invention.
Figure 2:
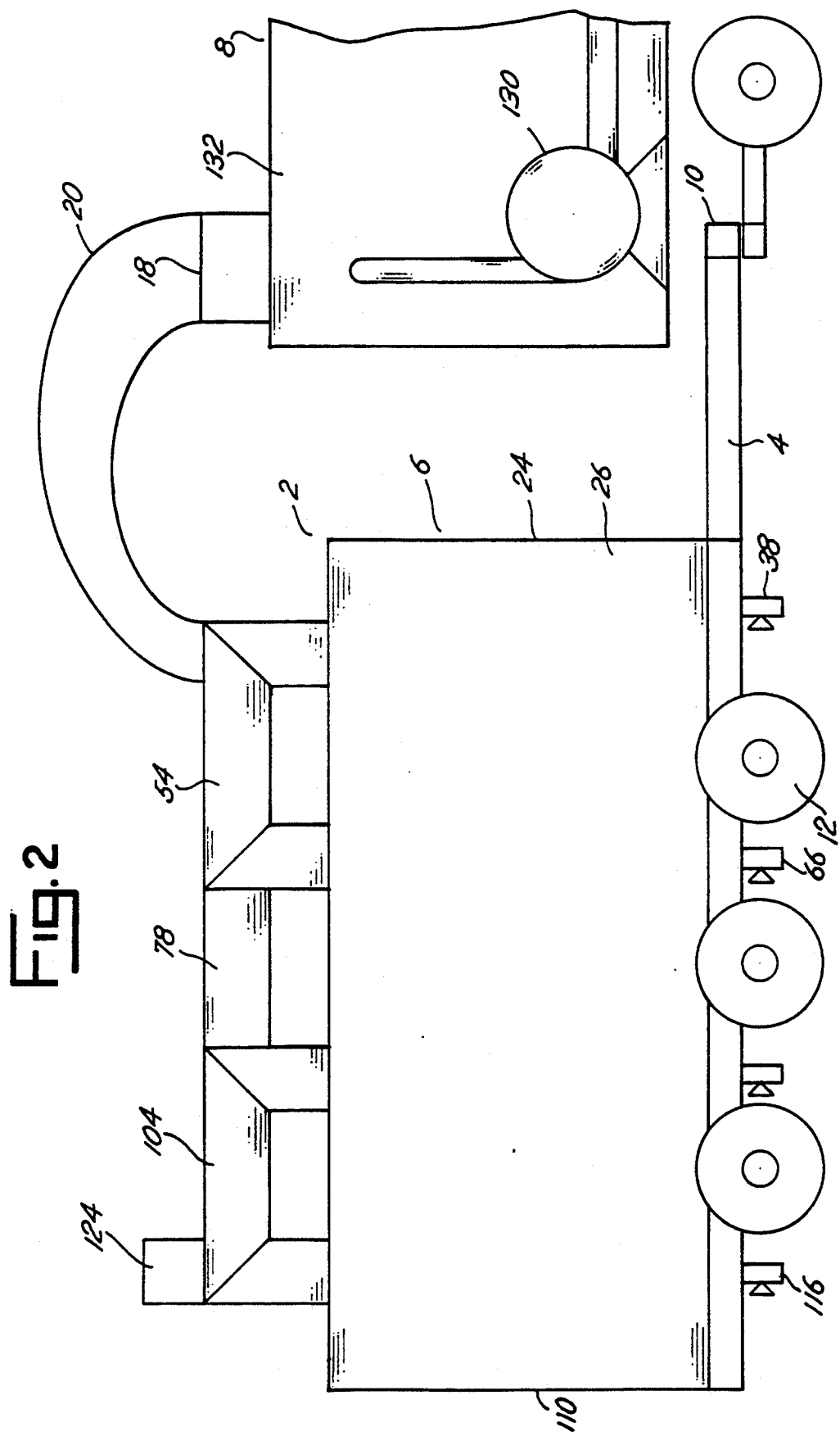
FIG. 2 is a side elevation view of the apparatus shown in FIG. 1 with a vacuum truck and flexible chute connected thereto.
Figure 3:
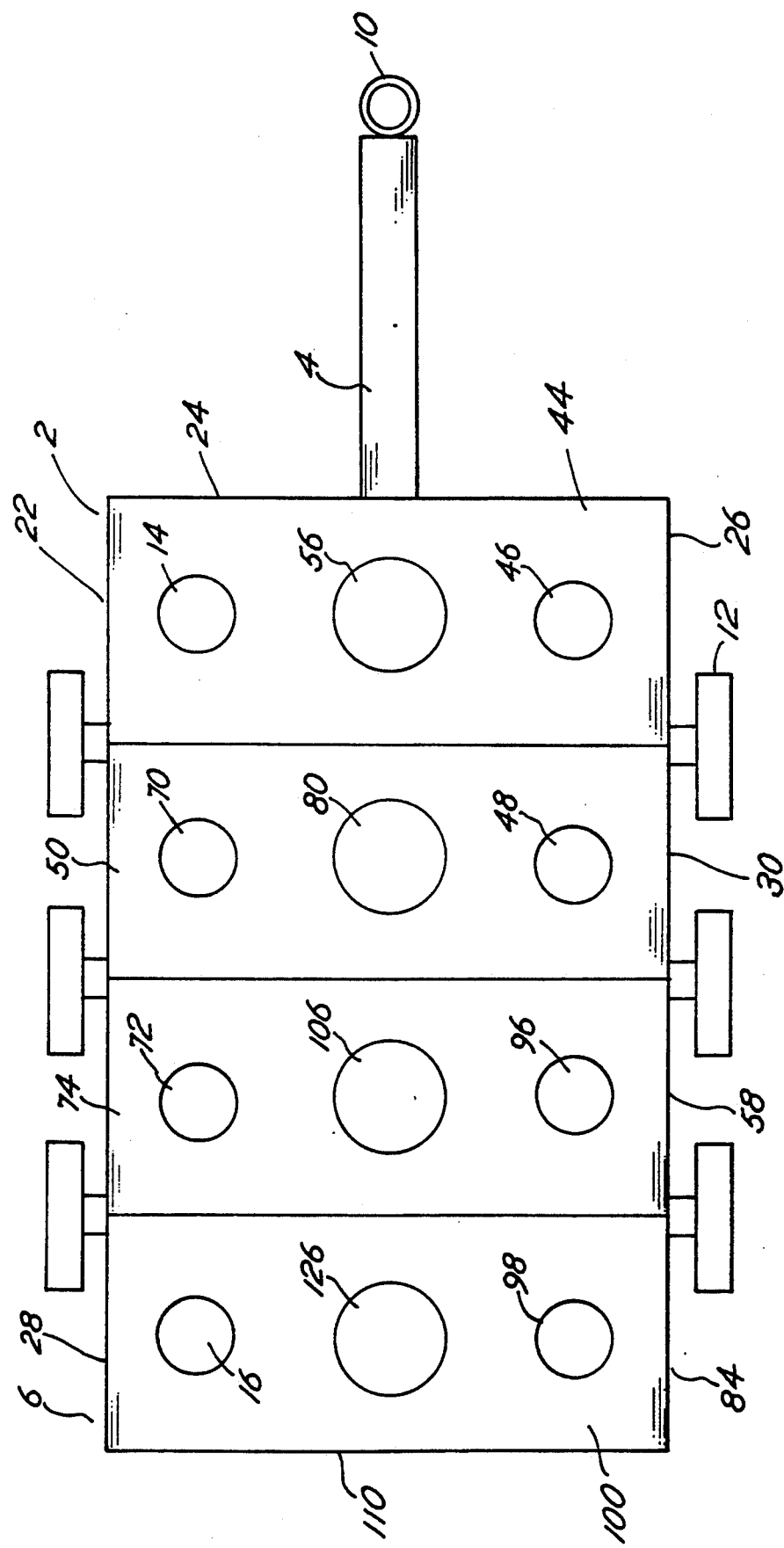
FIG. 3 is a plan view of a vacuum truck exhaust gas treatment apparatus with the external piping and access covers removed therefrom.
Figure 4:
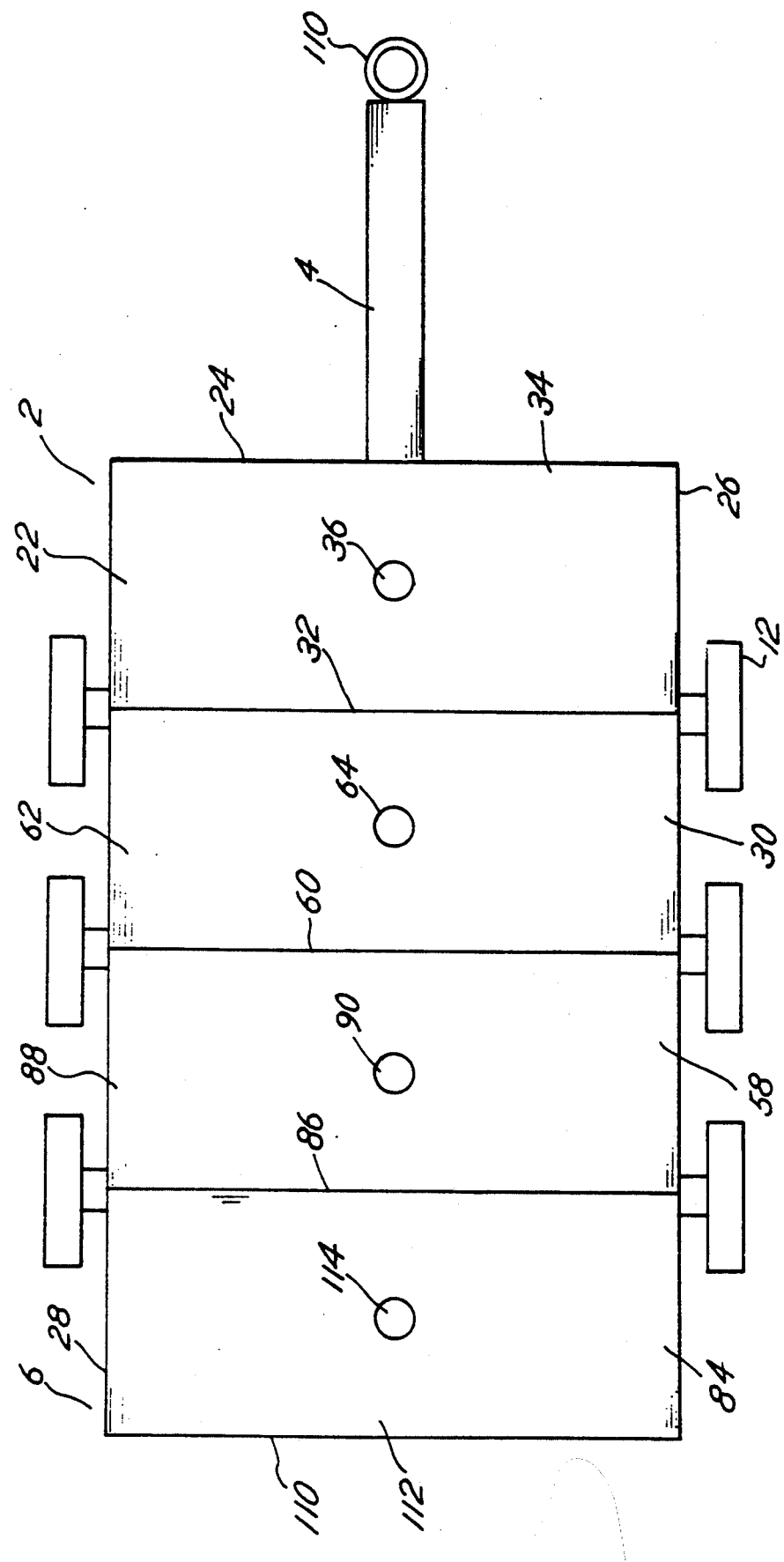
FIG. 4 is a plan view of a vacuum truck exhaust gas treatment apparatus with the top wall removed from each chamber.
Figure 5:
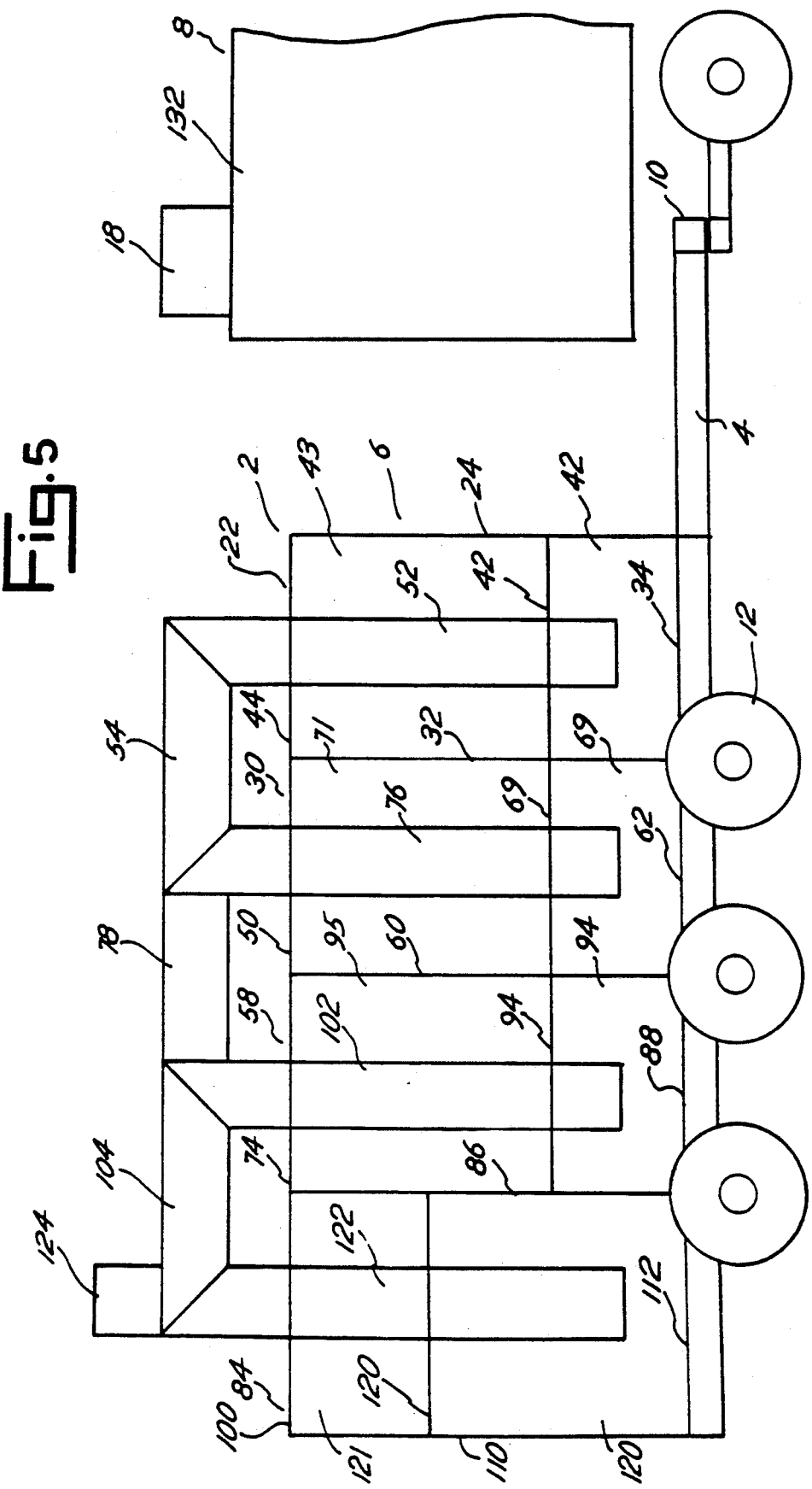
FIG. 5 is a side elevation view of the apparatus shown in FIG. 1 with the first longitudinal side removed thereby revealing the internal components of each chamber.
Figure 6:
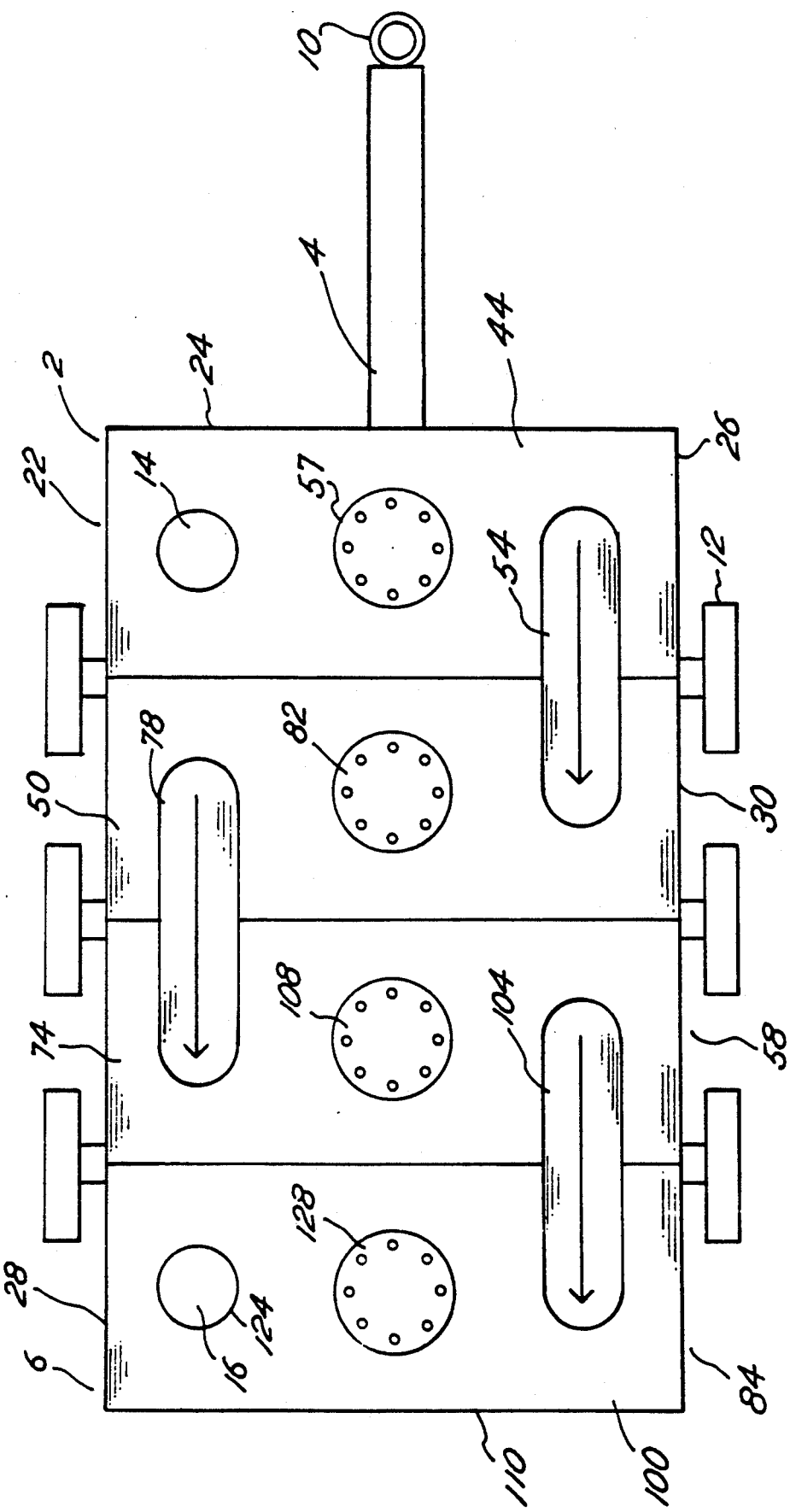
FIG. 6 is the plan view shown in FIG. 1 with the air and gas flow stream directions shown thereon.
Figure 7:
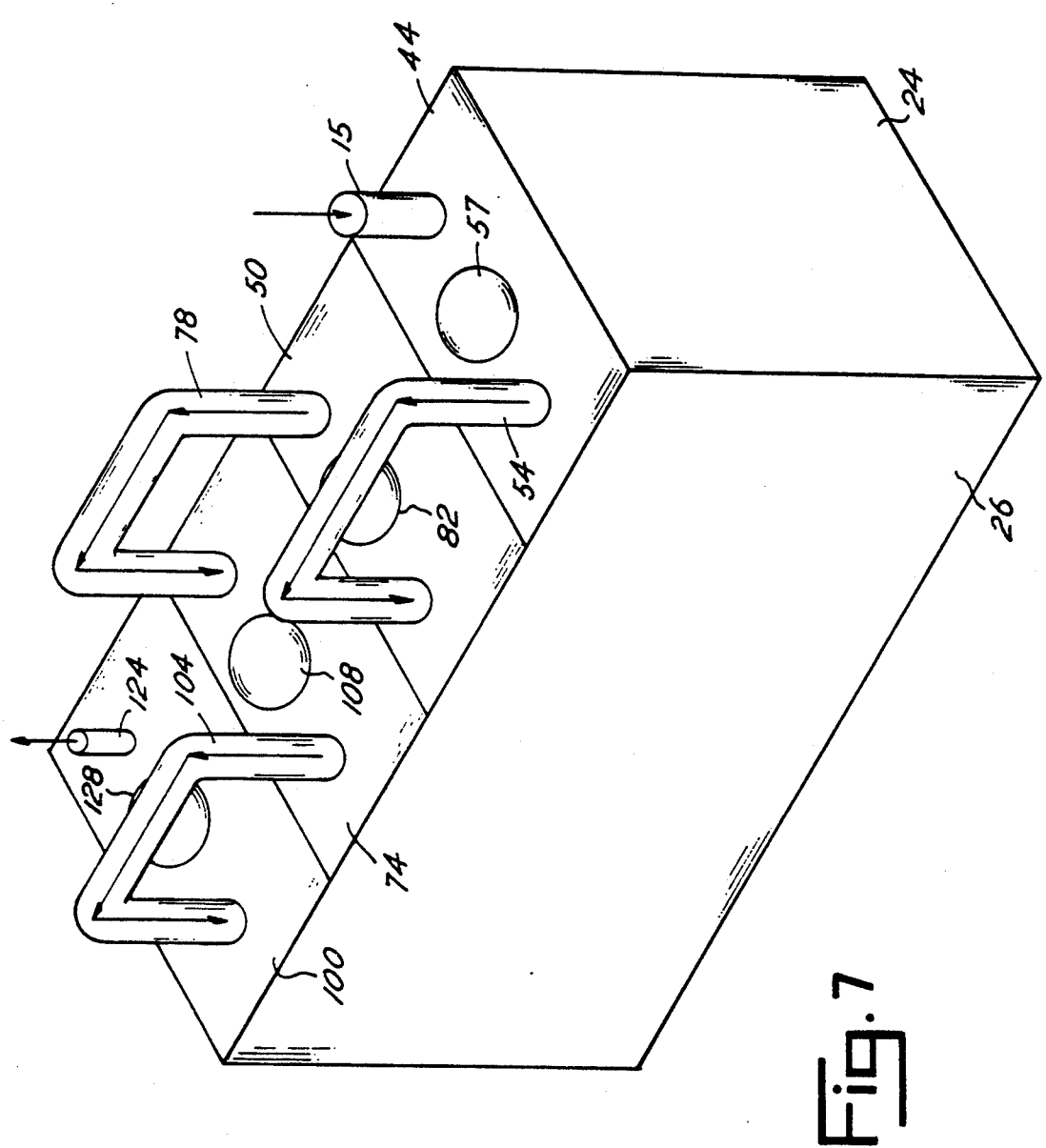
FIG. 7 is a perspective view of a vacuum truck exhaust gas treatment apparatus with the trailer removed and the air and gas flow stream directions shown thereon.
Figure 8:
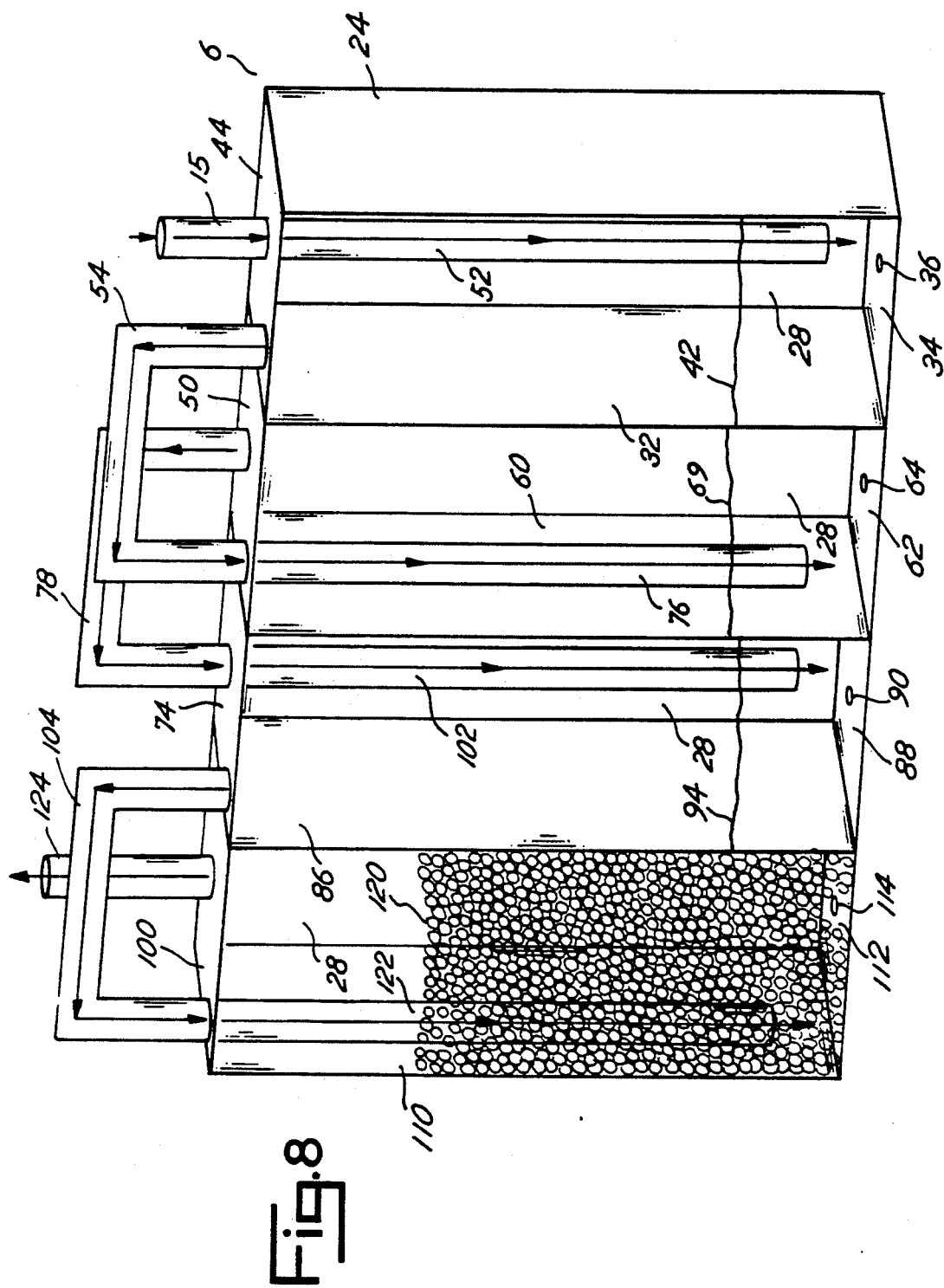
FIG. 8 is a perspective view of a vacuum truck exhaust gas treatment apparatus with the trailer and first longitudinal side wall removed and the air and gas flow stream directions shown thereon.

A vacuum truck exhaust gas treatment apparatus 2 in accordance with the present invention includes a trailer 4 having an enclosed housing 6 attached thereto to receive the air and hydrocarbon gases discharged from a vacuum truck 8. The treatment apparatus 2 removes the hydrocarbon gases from the air and then discharges the air to the atmosphere.

The trailer 4 includes a trailer hitch 10 to provide direct coupling to a vacuum truck 8, and a plurality of wheels 12 to allow the trailer 4 to travel with the vacuum truck 8.

The housing 6 has an inlet port 14 and an intake pipe 15 connected thereto to receive the air and hydrocarbon gases discharged from the vacuum truck 8, and an outlet port 16 to discharge air with the hydrocarbon gases removed therefrom to the atmosphere.

The intake pipe 15 on the housing 6 is connected to a discharge port 18 on the vacuum truck 8 by utilizing a flexible chute 20 capable of twisting with any turn the vacuum truck 8 might make while maintaining a sealed conduit between the housing 6 and truck 8 to prevent any gases from escaping to the atmosphere.

The housing 6 is about one-third the size of the vacuum truck 8, rectangular in form when viewed from the top or side, and divided into four internal isolated chambers of equal volume.

A first chamber 22 is positioned adjacent a first lateral side wall 24 of the housing 6. The chamber 22 extends from the first longitudinal side wall 26 to the second longitudinal side wall 28 of the housing 6, and is isolated from a second chamber 30 by a first isolation side wall 32. The first chamber 22 has a bottom wall 34 with a first drain port 36 therethrough. A first drain valve 38 is connected to the outer side 40 of the bottom wall 34 at the drain port 36. The lower one-third portion of the chamber 22 is filled with water 42 and the upper two-thirds portion 43 containing air and gas with the water level adjusted by the first drain valve 38. The chamber 22 has a top wall 44 with inlet port 14 to receive air and gases from the vacuum truck 8 and an outlet port 46 connected to an inlet port 48 in a top wall 50 of the second chamber 30 in the housing 6.

The inlet port 14 has an inlet pipe 52 connected thereto extending into the first chamber 22 to about a foot below the surface of the water 42 contained therein. The outlet port 46 is connected to the inlet port 48 of the second chamber 30 via an outlet pipe 54 above the top wall 44. The pipe 54 directs air and gases from the first chamber 22 to the second chamber 30 in the housing 6.

A first access port 56 is positioned in the top wall 44 of the first chamber 22 between the inlet port 14 and the outlet port 46. The first access port 56 allows maintenance personnel access to the first chamber 22 to inspect and repair when the apparatus 2 is not in service. A first access port cover 57 is utilized to seal the access port when the apparatus 2 is in operation.

The second chamber 30 is positioned adjacent the first isolation side wall 32, extends from the first longitudinal side wall 26 to the second longitudinal side wall 28 of the housing 6, and is isolated from a third chamber 58 by a second isolation side wall 60. The second chamber 30 has a bottom wall 62 with a second drain port 64 therethrough. A second drain valve 66 is connected to the outer side 68 of the bottom wall 62 at the drain port 64. The lower one-third portion of second chamber 30 is filled with a liquid caustic material, such as sodium-hydroxide solution 69, and the upper two-thirds portion 71 containing air and gas with the solution level adjusted by the second drain valve 66. The second chamber 30 has a top wall 50 with inlet port 48 to receive air and gases from the first chamber 22 and an outlet port 70 connected to an inlet port 72 in a top wall 74 of the third chamber 58 in the housing 6.

The inlet port 48 has an inlet pipe 76 connected thereto extending down into the second chamber 30 to about a foot below the surface of the sodium-hydroxide solution 69 contained therein. The outlet port 70 is connected to the inlet port 72 of the third chamber 58 via an outlet pipe 78 above the top wall 50. The pipe 78 directs air and gases from the second chamber 30 to the third chamber 58 in the housing 6.

A second access port 80 is positioned in the top wall 50 of the second chamber 30 between the inlet port 48 and the outlet port 70. The second access port 80 allows maintenance personnel access to the second chamber 30 to inspect and repair when the apparatus 2 is not in service. A second access port cover 82 is utilized to seal the access port 80 when the apparatus 2 is in operation.

The third chamber 58 is positioned adjacent the second side wall 60, extends from the first longitudinal side wall 26 to the second longitudinal side wall 28 of the housing 6, and is isolated from a fourth chamber 84 by a third isolation side wall 86. The third chamber 58 has a bottom wall 88 with a third drain port 90 therethrough. A third drain valve 90 is connected to the outer side 92 of the bottom wall 88 at the drain port 90. The lower one-third portion of the third chamber 58 is filled with water 94 and the upper two-thirds portion 95 containing air and gas with the water level adjusted by the third drain valve 90. The third chamber 58 has a top wall 74 with inlet port 72 to receive air and gases from the second chamber 30 and an outlet port 96 connected to an inlet port 98 in a top wall 100 of the fourth chamber 84 in the housing 6.

The inlet port 72 of the third chamber has an inlet pipe 102 connected thereto extending down into the third chamber 58 to about a foot below the surface of the water 94 contained therein. The outlet port 96 is connected to the inlet port 98 at the fourth chamber 84 via an outlet pipe 104 above the top wall 74. The pipe 104 directs air and gases from the third chamber 58 to the fourth chamber 84 in the housing 6.

A third access port 106 is positioned in the top wall 74 of the third chamber 58 between the inlet port 72 and the outlet port 96. The third access port 106 allows maintenance personnel access to the third chamber 58 to inspect and repair when the apparatus 2 is not in service. A third access port cover 108 is utilized to seal the access port 106 when the apparatus 2 is in operation.

The fourth chamber 84 is positioned adjacent the third isolation side wall 86, extends from the first longitudinal side wall 26 to the second longitudinal side wall 28 of the housing 6, and is enclosed by a second lateral side wall 110 of the housing 6. The fourth chamber 84 has a bottom wall 112 with a fourth drain port 114 therethrough. A fourth drain valve 116 is connected to the outer side 118 of the bottom wall 112 at the drain port 114. The lower two-thirds portion of the fourth chamber 84 is filled with charcoal 120 and the upper one-third portion 121 containing air and gas. Only liquid that may accumulate in the fourth chamber 84 is removed via the drain valve 116. The fourth chamber 84 has a top wall 100 with an inlet port 98 to receive air and gases from the third chamber 58 and an outlet port 16 to allow clean air to be discharged to the atmosphere from the housing 6.

The inlet port 98 of the fourth chamber 84 has an inlet pipe 122 connected thereto extending down into the fourth chamber 84 to about a foot above the upper surface of the bottom wall 112. The outlet port 16 has an outlet pipe 124 connected thereto that extends about two feet above the top wall 100.

A fourth access port 126 is positioned in the top wall 100 of the fourth chamber 84 between the inlet port 98 and the outlet port 116. The fourth access port 126 allows maintenance personnel access to the fourth chamber 84 to inspect and repair when the apparatus 2 is not in service. A fourth access port cover 128 is utilized to seal the access port 126 when the apparatus 2 is in operation.

The vacuum truck exhaust gas treatment apparatus operates as follows:

A vacuum truck 8 "sucking up" liquids with hydrocarbons in a refinery takes in large quantities of air with the liquid. The truck deposits the liquids in a tank and discharges the air along with the hydrocarbon gases that have separated from the liquid. The air and hydrocarbon gases are directed to the gas treatment apparatus 2 hitched to the truck via a flexible chute 20 that couples the discharge port of the truck 8 to the inlet port 14 of the first chamber 22 of the gas treating apparatus 2.

The vacuum truck 8 includes a centrifuge pump 130 that sucks in hydrocarbon liquids and air, deposits the liquids in a tank 132, and discharges the air and hydrocarbon gases with enough force to circulate both the air and gases through the housing 6 of the apparatus 2. The air and gases flow through the inlet port 14 of the first chamber 22, down the inlet pipe 52, and disperse the contents into the water 42 at the bottom portion of the chamber 22 about a foot below the surface of the water.

The water 42 removes liquids and other particles that may be discharged from the vacuum truck 8 along with air and hydrocarbon gases. The air and gases rise from the water and into the upper portion 43 of the chamber wherein gravity forces water to drop from the air and gas flow stream. The air and gases then flow through the outlet port 46 of the first chamber 22 and the outlet pipe 54, through the inlet port 48 of the second chamber 30, down the inlet pipe 76, and disperse into the caustic sodium-hydroxide solution 69 at the bottom portion of the chamber 30 about a foot below the surface of the solution 69.

The sodium-hydroxide solution reacts with the hydrogen sulfide gas thereby forming a sodium sulfide precipitate that drops to the bottom of the chamber, and water that mixes with the remaining sodium-hydroxide solution. The air and remaining gases rise from the sodium-hydroxide solution 69 and into the upper portion 71 of the chamber 30 wherein gravity forces any small liquid droplets elevated by the rising air and gases to drop from the air and gas flow stream. The air and gases continue through the outlet port 70 of the second chamber 30 and the outlet pipe 78, through the inlet port 72 of the third chamber 58, down the inlet pipe 102, and disperse into the water 94 at the bottom portion of the third chamber 58 about a foot below the surface of the water 94.

The water 94 removes any sodium-hydroxide mist that may not have dropped from the air and gas flow in the upper portion 71 of the second chamber 30. All sodium-hydroxide must be removed before the air and gases make contact with the charcoal 120 in the fourth chamber 84. The air and remaining gases rise from the water 94 and into the upper portion 95 of the third chamber 58 wherein gravity forces water to drop from the air and gas flow stream. The air and gas then flow through the outlet port 96 of the third chamber 58 and the outlet pipe 104, through the inlet port 98 of the fourth chamber 84, down the inlet pipe 122, and disperse into the charcoal 120 at the bottom portion of the fourth chamber 84 about a foot above the upper surface of the bottom wall 112.

The charcoal 120 reacts with remaining gases thereby forming a hydrocarbon precipitate that deposits upon the surface of the charcoal while allowing clean air to rise into the upper portion 121 of the chamber 84 wherein gravity forces any residual water to drop from the air flow. The clean air rises through the outlet port 16 of the fourth chamber 84, and through the outlet pipe 124 to the atmosphere. After prolonged use, all four chambers must be emptied and recharged with the same components as described herein to insure efficient operation of the apparatus 2.

Although the aforementioned description has concentrated on utilizing the gas treating apparatus 2 in conjunction with a vacuum truck 8, the apparatus 2 has other applications including some requiring the apparatus to remain in a stationary position. One such application is shown on drawing FIG. 9.

FIG. 9 shows a tank 134 having a hydrocarbon gas and air mixture therein. A vacuum blower 136 is inserted in a manhole 138 at the base of the tank 134. The blower 136 has a hose 140 connected to a discharge port 142 on the blower 136 with the hose 140 extending and connected to the inlet pipe 15 on the gas treating apparatus 2. An inlet cover 144 on top of the tank 134 is opened to allow air to be drawn into the tank when the vacuum blower 136 is turned on thereby preventing a vacuum inside the tank 134, allowing the air and gas mixture to be drawn out of the tank 134 and discharged into the gas treating apparatus 2 wherein the aforementioned operating procedure is followed with the results being the removal of the air and gas mixture from the tank 134 and the discharge of only clean air to the atmosphere.

I claim:

1. A waste material treatment apparatus to remove gases, liquids and solids from collected waste materials comprising liquids, solids, air and other gases to purify said air for discharge back into the atmosphere, comprising a treatment receptacle, a first treatment chamber in said treatment receptacle, first separation means in said first treatment chamber to separate said liquids and solids from said air and other gases, a second treatment chamber in said treatment receptacle, second separation means in said second treatment chamber to separate said other gases from said air, said first and second separation means being different from each other and being retained in their respective treatment chambers separated from each other, said treatment receptacle having inlet means to flow said collected waste materials to said first separation means in said first treatment chamber to separate said liquids and solids from said air and other gases of said collected waste materials, transfer means to transfer said air and other gases from said first treatment chamber to said second separation means in said second treatment chamber to separate said other gases from said air to purify said air for discharge back into the atmosphere, and outlet means to discharge said air to the atmosphere after said other gases have been separated therefrom.

2. A waste material treatment apparatus as set forth in claim 1, wherein said first separation means in said first treatment chamber comprises a volume of water and a first chamber free space above the surface of said volume of water, said inlet means to flow said collected waste materials to said first separation means in said first treatment chamber comprises a first conduit having an inlet aperture to receive said collected waste materials and an outlet aperture to discharge said collected waste materials, said first conduit extending into said first treatment chamber and said volume of water, said outlet aperture of said first conduit terminating and opening below said surface of said volume of water in said first treatment chamber to discharge said collected waste materials into said volume of water for retaining said liquids and said solids therein while said air and said other gases of said collected waste materials escape upwardly above said surface of said volume of water into said first chamber free space thereabove.

3. A waste material treatment apparatus as set forth in claim 2, wherein said second separation means in said second treatment chamber comprises a volume of liquid caustic material and a second chamber free space above the surface of said volume of caustic material, said transfer means includes a second conduit having a second conduit inlet aperture opening to said first chamber free space above said surface of said volume of water to receive said air and said other gases which have escaped therein, a second conduit outlet aperture to discharge said air and said other gases, said second conduit extending into said second treatment chamber and said volume of caustic material, said second conduit outlet aperture terminating and opening below said surface of said volume of caustic material in said second treatment chamber to discharge said air and said other gases into said volume of caustic material for retaining said other gases therein while said air escapes upwardly above said surface of said volume of caustic material into said second chamber free space thereabove.

4. A waste material treatment apparatus as set forth in claim 3, wherein said caustic material includes a solution of sodium hydroxide.

5. A waste material treatment apparatus as set forth in claim 4, wherein said other gases include hydrogen sulfide gas, said sodium hydroxide of said solution thereof reacts with said hydrogen sulfide gas to form a sulfide precipitate which falls to the bottom of said second treatment chamber and is retained therein, and a sodium-hydroxide mist which rises above said surface of said volume of caustic material into said second chamber free space thereabove, including a third treatment chamber, a second volume of water in said third treatment chamber and a third chamber free space above the surface of said second volume of water, said second volume of water being retained in said third treatment chamber separated from said volume of caustic material in said second treatment chamber and separated from said first volume of water in said first treatment chamber, a third conduit having a third conduit inlet aperture opening to said second chamber free space above said surface of said volume of caustic material to receive said air and said sodium-hydroxide mist which have escaped therein, a third conduit outlet aperture to discharge said air and said sodium-hydroxide mist, said third conduit extending into said third treatment chamber and said second volume of water, said first conduit outlet aperture terminating and opening below said surface of said second volume of water in said third treatment chamber for retaining said sodium-hydroxide mist therein while said air and any remaining portion of said other gases not previously retained escape upwardly above said surface of said second volume of water into said third chamber free space thereabove.

6. A waste material treatment apparatus as set forth in claim 5, including a fourth treatment chamber, a volume of charcoal in said fourth treatment chamber and a fourth chamber free space above the surface of said volume of charcoal, said volume of charcoal being retained in said fourth treatment chamber separated from said second volume of water in said third treatment chamber, from said volume of caustic material in said second treatment chamber and from said first volume of water in said first treatment chamber, a fourth conduit having a fourth conduit inlet aperture opening to said third chamber free space above said surface of said second volume of water to receive said air and said remaining portion of said other gases which may not have been previously retained, a fourth conduit outlet aperture to discharge said air and said remaining portion of said other gases, said fourth conduit extending into said fourth treatment chamber and said volume of charcoal, said fourth conduit outlet aperture terminating and opening below said surface of said volume of charcoal in said fourth treatment chamber for retaining said remaining portion of said other gases therein while said air alone escapes upwardly above said surface of said volume of charcoal into said fourth chamber free space thereabove.

7. A waste material treatment apparatus as set forth in claim 6, wherein said outlet means to discharge said air to the atmosphere after said other gases have been separated therefrom includes a discharge conduit, said discharge conduit having a discharge conduit inlet aperture opening to said fourth chamber free space above said surface of said volume of charcoal to receive said air which has escaped therein after said other gases have been removed therefrom, a discharge conduit outlet aperture to discharge said air, said discharge conduit extending from said fourth chamber free space terminating outwardly therefrom with said discharge conduit outlet aperture opening to the atmosphere for discharge of said air thereto.

8. A waste material treatment apparatus as set forth in claim 1, wherein said transfer means includes air circulating means to move said collected waste materials comprising liquids, solids, air and other gases from each of said treatment chambers to the others of said treatment chambers and to said outlet means for discharge of said air to the atmosphere after said other gases have been separated therefrom.

9. A waste material treatment apparatus as set forth in claim 8, wherein said air circulating means includes a pump having an intake port and a discharge port, vacuum pick-up means connected to said intake port of said pump to draw in and collect said waste materials comprising liquids, solids, air and other gases, a transfer conduit connected between said discharge port of said pump and said inlet means of said treatment receptacle to flow said collected waste materials thereto and through said treatment chambers for removal of said liquids, solids and other gases from said air to purify it and to discharge purified air back to the atmosphere after having been flowed through said treatment chambers.

10. A waste material treatment apparatus as set forth in claim 6, wherein each of said treatment chambers includes an access aperture for inspection, cleaning and re-charging with the respective materials to be placed therein, and a closure member to open and close said access aperture of each of said treatment chambers.

11. A waste material treatment apparatus as set forth in claim 1, wherein said treatment apparatus is transportable, including a wheel assembly, a carriage frame mounted on said wheel assembly, said treatment receptacle and said treatment chambers thereof being mounted on said carriage frame.

* * * * *